United States Patent [19]

White et al.

[11] Patent Number: 4,942,206

[45] Date of Patent: Jul. 17, 1990

[54] BLENDS AND COPOLYMERS OF POLYETHERIMIDE AND FUNCTIONALIZED POLYPHENYLENE ETHER

[75] Inventors: Dwain M. White, Schenectady; Laura A. Socha, Troy, both of N.Y.; Roelof Van Der Meer, AZ Bergan op Zoom, Netherlands

[73] Assignee: General Electric Company, Schenectady, N.Y.

[21] Appl. No.: 209,447

[22] Filed: Jun. 21, 1988

[30] Foreign Application Priority Data

Jul. 6, 1987 [NL] Netherlands .......................... 8701585

[51] Int. Cl.$^5$ ................................................ C08L 71/12
[52] U.S. Cl. ...................................... 525/397; 524/508; 525/66; 525/92; 525/232; 525/905
[58] Field of Search ................................. 525/397, 905

[56] References Cited

U.S. PATENT DOCUMENTS

| | | |
|---|---|---|
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 4,293,670 | 10/1981 | Robeson et al. . |
| 4,315,086 | 2/1982 | Ueno et al. . |
| 4,431,779 | 2/1984 | White et al. . |
| 4,642,358 | 2/1987 | Aycock et al. . |
| 4,654,405 | 3/1987 | Jalbert et al. .................. 525/397 |
| 4,732,937 | 3/1988 | Sybert . |
| 4,769,423 | 9/1988 | Risse et al. . |

FOREIGN PATENT DOCUMENTS

| | | |
|---|---|---|
| 55-15870 | 2/1980 | Japan . |
| 59-66452 | 4/1984 | Japan . |

*Primary Examiner*—Jacob Ziegler
*Attorney, Agent, or Firm*—William H. Pittman; James C. Davis, Jr.

[57] ABSTRACT

Polymer blends and copolymers made therefrom, of anhydride-functionalized polyphenylene ether and polyetherimide. The components of the blends have improved compatibility, resulting in more homogeneous blends. The blends exhibit good mechanical properties and are suitable for forming films, molded products and other useful articles of manufacture. The copolymers have utility as compatibilizers for blends of polyphenylene ether and polyetherimide.

6 Claims, No Drawings

BLENDS AND COPOLYMERS OF POLYETHERIMIDE AND FUNCTIONALIZED POLYPHENYLENE ETHER

BACKGROUND OF THE INVENTION

This invention relates to polymer blends of polyphenylene ether and polyetherimide, and copolymers made therefrom, and more particularly to blends of functionalized polyphenylene ether and polyetherimide, and copolymers made therefrom.

Blends of polyphenylene ether and polyetherimide are described in U.S. Pat. No. 4,431,779 to White et al, incorporated herein by reference in its entirety. Such blends are of interest because their components are generally compatible and the mixtures have good impact strength as well as good mechanical properties. However, these blends typically undergo phase separation and delamination because of the presence therein of large, incompletely dispersed polyphenylene ether particles and the absence of phase interaction between the two resin phases.

Aycock et al (U.S. Pat. No. 4,642,358 and Int. Pub. No. WO 86/02086) disclose the use of functionalized polyphenylene ether as a compatibilizer for polyphenylene ether-polyamide blends. The functionalized polyphenylene ether is the reaction product of a polyphenylene ether and a compound of the general formula (i)—Z—(ii), wherein (i) is at least a group of the formula [X-C(O)] with X=F, Cl, Br, I, OH, —OR, or —O—C-(O)—R with R=H, alkylene or aryl, wherein (ii) is at least a carboxylic acid, acid anhydride, acid amide, imido, carboxylic acid ester, amino or hydroxyl group and wherein the groups (i) and (ii) are covalently bonded together via a bridge Z and wherein Z is a bivalent hydrocarbon radical. The reaction product of a polyphenylene ether and trimellitic anhydride acid chloride is preferably used. Aycock et al, in WO-A-86/02086, further disclose compositions comprising functionalized polyphenylene ether, polyphenylene ether and polyamide, and compositions comprising functionalized polyphenylene ether and polyamide.

Van Der Meer et al (Int. Pub. No. WO 87/00540) describe functionalized polyphenylene ethers which form compatible compositions when blended with polymers such as polyamides and linear polyesters. The functionalized polyphenylene ether is the reaction product of a polyphenylene ether and an unsaturated dicarboxylic acid, for example, fumaric acid or maleic acid anhydride or derivatives thereof.

Sybert (U.S. Pat. No. 4,732,937) describes the use of copolymers comprising epoxide-functionalized polyphenylene ethers and polyamides or linear polyesters, as compatibilizers for blends of polyphenylene ethers and polyamides or linear polyesters. The epoxide-functionalized polyphenylene ethers are prepared by the reaction of functionalized epoxide with acid-functionalized polyphenylene ether. Preferred functionalizing agents for the polyphenylene ether include maleic acid and its derivatives (especially maleic anhydride), fumaric acid and trimellitic anhydride acid chloride.

In JP59-66452 to Unitika, functionalized polyphenylene ethers are obtained by reacting in the presence of a radical initiator a polyphenylene ether and a compound having a carboxylic acid radical or an acid anhydride (for example, maleic acid anhydride).

Although the above references disclose blends of polyphenylene ether and other polymers, including polyetherimide, wherein the blends have good compatibility and other desirable properties, there is continuing interest in preparing blends of polyphenylene ether and polyetherimide which have improved compatibility and other improvements in properties.

SUMMARY OF THE INVENTION

A principal object of the present invention is to provide novel polyphenylene ether-polyetherimide compositions having improved compatibility and good mechanical properties.

A further object is to provide novel copolymers capable of compatibilizing polyphenylene etherpolyetherimide blends.

Other objects will be apparent from the following description of the invention.

In one of its aspects, the present invention is based on the discovery that a blend of polyphenylene ether and polyetherimide having good mechanical properties, in particular good impact strength and good tensile strength, can be obtained by using particular polyphenylene ether compounds. The blends according to the invention are characterized in that the polyphenylene ether is replaced entirely or partly by a functionalized polyphenylene ether, i.e., a polyphenylene ether having reactive substituents not usually found on a polyphenylene ether chain and which enter into specific desirable reactions.

Functionalized polyphenylene ether is to be understood to include polyphenylene ethers which comprise one or more reactive groups capable of reacting with amine groups, or groups derived from amines, of the polyetherimide. Examples of reactive groups in the functionalized polyphenylene ethers include anhydride groups, carboxylic acid groups, and epoxy groups.

In another aspect, the present invention is directed to polyphenylene ether-polyetherimide copolymers comprising anhydride functionalized polyphenylene ether and amine-terminated polyetherimide. In preferred embodiments, trimellitic anhydride acid chloride, maleic acid anhydride, and fumaric acid are used as the functionalizing agents for the polyphenylene ether. These copolymers have been found to have utility as compatibilizers for blends of polyphenylene ether and polyetherimide.

DETAILED DESCRIPTION OF THE INVENTION

In its broadest aspects, the invention is directed to polymer blends which contain a functionalized polyphenylene ether and a polyetherimide.

According to the invention, such compositions comprise about 0–95% polyetherimide, about 95–0% polyphenylene ether, about 2–50% anhydride-functionalized polyphenylene ether, and about 50–2% amine-functionalized polyetherimide. The anhydride-functionalized polyphenylene ether and the amine-functionalized polyetherimide will react to form a copolymer, resulting in a final blend containing about 5–100% copolymer. In a preferred embodiment, the blends comprise about 10–80% polyetherimide, about 80–10% polyphenylene ether, about 5–20% anhydride-functionalized polyphenylene ether and about 20–5% amine-functionalized polyetherimide, with the final blends containing about 10–40% copolymer.

The polymer blends according to the invention comprises, as a functional polyphenylene ether, the reaction product of a polyphenylene ether and a compound of the general formula (i)—Z—(ii), wherein (i) is at least a group of the formula [X—C(O)] with X=F, Cl, Br, I, OH, —OR, or —O—C(O)—R with R=H, alkyl or aryl, wherein (ii) is at least a carboxylic acid, acid anhydride, acid amide, imido, carboxylic acid ester, amino or hydroxyl group and wherein the groups (i) and (ii) are bonded together covalently via a bridge Z and wherein Z is a bivalent hydrocarbon radical. The polymer blend may also contain as a functionalized polyphenylene ether, for example, the product obtained by melt extrusion of a polyphenylene ether and maleic acid anhydride or a derivative thereof, for example, maleic acid, maleimide, maleic hydrazide, dichloromaleic anhydride, and maleic acid amide. Fumaric acid or derivatives thereof, including salts, esters, anhydrides, amides and imides, may also be used instead of maleic acid anhydride.

The polymer blend comprises a polyetherimide having reactive terminal groups which can react with the reactive functionalizing group on the polyphenylene ether. Preferred reactive terminal groups are amino groups which, for example, can react with anhydride groups or carboxylic acid groups of the functionalized polyphenylene ether.

In addition to the components mentioned above, the polymer blend may also comprise other constituents. It may be desirable in the blends to replace a part of the functionalized polyphenylene ether with a "common", i.e., non-functionalized, polyphenylene ether, hereinafter referred to as polyphenylene ether. In other words, the blend may comprise a functionalized polyphenylene ether or a mixture of polyphenylene ether and functionalized polyphenylene ether.

The polyphenylene ether-polyetherimide blends of this invention generally comprise from about 5 to about 95 weight percent of the polyphenylene ether component and from about 5 to about 95 weight percent polyetherimide. The polyphenylene ether component can be all functionalized polyphenylene ether or a mixture of functionalized and non-functionalized polyphenylene ether. Preferred ranges for the major components of the blends are from about 10 to about 80 weight percent polyphenylene ether.

In general, it is desirable to have at least about 2 weight percent functionalized polyphenylene ether present in order to provide adequate compatibilization of the blend.

The polyphenylene ether present usually has intrinsic viscosity ranging from about 0.2 to 1.0 dl/g and preferably from about 0.3 to 0.5 dl/g, as measured in chloroform at 25° C. Polyphenylene ether functionalized with trimellitic anhydride acid chloride has an intrinsic viscosity from about 0.1 to 0.7 dl/g, and preferably about 0.2 to 0.5 dl/g. The polyetherimide has an intrinsic viscosity ranging from about 0.2 to 1.0 dl/g, as measured in chloroform at 25° C., and preferably about 0.3 to 0.5 dl/g. The amine-terminated polyetherimide will have an intrinsic viscosity of about 0.05 to 0.5, with about 0.1 to 0.4 being the preferred range.

The blends of the invention are particularly suitable for manufacture of articles by injection molding. It is also possible to cast or mold films and sheet from these blends.

Functionalized polyphenylene ethers are products derived from the generally known polyphenylene ethers. Suitable polyphenylene ethers and methods for their preparation are disclosed in U.S. Pat. No. 4,431,779 to White et al, U.S. Pat. No. 3,306,874 and 3,306,875 to Hay and U.S. Pat. No. 3,257,357 and 3,257,358 to Stamatoff, all of which are incorporated herein by reference in their entirety.

In general, the functionalized polyphenylene ethers are obtained by a "post-treatment" of the generally known polyphenylene ethers. This "post-treatment" may consist of reaction of polyphenylene ether with a reagent in solution or by a melt extrusion of a polyphenylene ether together with the selected reagent. The reagent must be selected so that a reaction product is formed with the polyphenylene ether, which product has a group which is reactive with amine or amine derivative groups which are present in the polyetherimide. These functional polyphenylene ethers are well known in the art and have been used, in particular, in polymer mixtures of polyphenylene ether and polyamide.

Suitable functionalized polyphenylene ethers and methods for their preparation are described in U.S. Pat. No. 4,642,358 and Int. Pub. No. WO 86/02086 to Aycock et al, U.S. Pat. No. 4,732,937 to Sybert, and Int. Pub. No. WO 87/00540 to Van Der Meer et al, each of which has been discussed above and is incorporated by reference herein.

The types of functionalized polyphenylene ether mentioned hereinbefore comprise a carboxylic acid group or a group derived therefrom, for example, an anhydride group, as a functional group.

Polyetherimides are compounds well known in the art and are described in the above-mentioned U.S. Pat. No. 4,431,779 to White et al. Polyetherimides are generally prepared from aromatic bisether anhydrides and organic diamines. Examples of suitable organic diamines are disclosed in White et al.

When exactly equimolar quantities of bis(ether anhydride) and diamine are reacted with each other, the polymer chains have an equal number of terminal reactive amine groups and terminal reactive anhydride groups. When, as is sometimes done in practice, a small excess of diamine is used, polyetherimides having, on average, more than one terminal amine group per molecule are obtained.

In certain embodiments, it may be desirable to provide polyetherimides having a lower concentration of reactive terminal groups. In the polymerization of polyetherimides, a small quantity of monoamine and/or mono ether anhydride may be used as a chain stopper. In this manner, polyetherimides having a lower concentration of reactive terminal groups are obtained. These polyetherimides are commercially available.

A polyetherimide which comprises reactive amine terminal groups is preferably used in the polymer blend and copolymer according to the invention. Polyetherimides having a higher concentration of amine terminal groups can be obtained by the hydrolysis of polyetherimides having a low concentration of amine terminal groups, e.g., with water at an elevated temperature.

In addition to the constituents mentioned hereinbefore, the polymer blend and copolymer according to the invention may contain many other constituents.

The polymer blend and copolymer may also have one or more agents to improve the impact strength. Known agents which improve the impact strength or other properties of polyetherimides or of polyphenylene ethers may be used. Impact modifiers suitable for use in the present invention are disclosed in, for example, U.S. Pat. No. 4,732,937 to Sybert, which has been previously incorporated herein by reference. Agents which improve the impact strength of polyphenylene ethers include, for example, optionally hydrogenated, block copolymers with one or more blocks derived from conjugated diene units and with one or more blocks derived from vinylaromatic compounds. Agents which improve the impact strength of polyetherimides, include, for example, polysiloxanes having amine terminal groups. Other impact modifiers which may be used in the blends of the present invention include polystyrene or high impact polystyrene. The impact modifiers can be present in amounts up to about 10 parts by weight per 100 parts by weight of the resinous components of the blend or copolymer.

The polymer blend and copolymer according to the invention may further comprise conventional fillers and additives, for example, mineral fillers, glass fibers, or other mineral fibers, stabilizers, such as UV screens and antioxidants, flame-retarding agents, antistatically active agents and the like.

The polymer blends and copolymer according to the invention may be obtained according to generally used methods of preparing polymer mixtures. Compounding in an extruder is a preferred method.

The anhydride-functionalized polyphenylene oxide and the amine-terminated polyetherimide of the blends according to this invention react to form copolymers which have been found to be effective compatibilizers for polyphenylene ether-polyetherimide blends over a broad range of concentrations.

Normally blends of polyphenylene oxide and polyetherimide are inhomogeneous, as indicated by the hazy appearance of the blends. However, products containing the copolymer according to this invention formed clear film when cast from chloroform. Clarity of the film indicates either that there is good dispersion in the blends of the polyphenylene oxide and polyetherimide phases or that the two polymers have combined into each other to form one phase. It will be recognized that good dispersion of one polymer in the other will ordinarily afford a useful, compatible thermoplastic product.

The copolymers of this invention may be synthesized in solution and under solvent-free melt conditions. Methylene chloride fractionalization is used to remove unreacted polyetherimide from the products. The starting materials for these reactions are polyetherimide samples having terminal amino groups and polyphenylene oxide samples containing anhydride moieties. Two functionalized polyphenylene oxide species are particularly preferred for making the copolymers of this invention. One of these referred to as PPE—MA, is prepared by extruding a mixture of polyphenylene oxide and maleic anhydride, wherein the amount of maleic anhydride ranges from about 1 to 3 weight percent based on the weight of the PPE. The reaction of PPE—MA with an amine end group of polyetherimide results in a copolymer which is mainly a graft copolymer, that is, one in which a head end of a polyetherimide chain is attached to an internal unit of the polyphenylene oxide chain.

The other type of preferred functionalized polyphenylene oxide used to prepare the copolymer is referred to as PPE—TAAC, the product of a solution reaction of polyphenylene oxide with trimellitic anhydride acid chloride (TAAC) which is reacted in the presence of dimethylbutylamine. Reaction of PPE—TAAC with one amino end group of polyetherimide forms an A—B type block copolymer. Reaction of PPE—TAAC with both amino end groups of an alpha, omega amine terminated polyetherimide forms an ABA block copolymer. Suitable polyphenylene oxides for the purposes of this invention are disclosed in White et al, U.S. Pat. No. 4,431,779, which has been incorporated herein by reference in its entirety. A preferred polyphenylene oxide for this aspect of the invention is poly(2,6-dimethyl-1,4-phenylene oxide).

The amine-terminated polyetherimide samples of this invention may be prepared according to any of the methods well known to those skilled in the art, including the reaction of any aromatic bis(ether anhydride) with a slight molar excess (about 1 to 5 mole percent) of an organic diamine. Suitable dianhydrides and diamines for this invention as well as a suitable method for preparing amine-terminated polyetherimide, are disclosed in White et al, U.S. Pat. No. 4,431,779.

In a preferred embodiment, the amine-terminated polyetherimide samples were prepared by reacting, in the absence of a chain stopper, bisphenol-A-diphthalic acid anhydride with a small excess of m-phenylene diamine.

Melt reactions and solution reactions are suitable methods for forming the copolymer of this invention.

The melt reactions were run by heating the reactants under a nitrogen atmosphere at about 280° C. for several minutes. Agitation was provided for small scale reactions by manually stirring with a glass rod. On a larger scale, a Helicone reactor with intermeshing helical blades was used. With this equipment material containing at least 25% polyetherimide bound to polyphenylene oxide was obtained.

Solution reactions were run in toluene and in o-dichlorobenzene with either acetic acid or 2-hydroxypyridine as a catalyst. The traces of water that were generated during the condensation reaction to form the imide were removed with a Dean-Stark trap.

The processes described above produced mixtures of copolymer and starting homopolymers. The unreacted polyetherimide can be removed by methylene chloride fractionation. The methylene chloride forms a complex with the unreacted polyphenylene ether and with the polyphenylene ether portion of the copolymer. These complexes are insoluble in methylene chloride and can be separated from unreacted polyetherimide by filtration. Any polyetherimide that was present in the mixture was part of the copolymer otherwise it would have remained soluble in the methylene chloride.

A control reaction using unfunctionalized polyphenylene ether instead of PPE—MA or PPE—TAAC produced very little copolymer formation. Approximately 2% of the polyetherimide was bound to the polyphenylene ether.

The copolymer of the present invention has been found an effective agent for providing compatible blends of polyphenylene ether and polyetherimide over a broad range of concentrations of the blend components.

When used as a compatibilizing agent in resinous compositions, the copolymer is employed in amounts which are at least sufficient to effect compatibility of the polymer components. The expression "compatibility" is also intended to encompass stable dispersion of the two polymers to a degree which provides useful thermoplastic compositions, as well as useful non-delaminating molded and cast products. The copolymer is employed in amounts of about 5 to about 100% by weight, and, preferably, at about 10 to about 40% by weight of the resin portion of the composition.

The following examples illustrate, without limitation the principles and practices of the invention.

EXAMPLE 1 AND COMPARATIVE EXAMPLE A

Two different polymer blends were prepared starting from a polyetherimide derived from bisphenol-A-diphthalic acid anhydride and m-phenylene diamine. The polyetherimide had an intrinsic viscosity of 0.34 dl/g, measured at 25° C. in dichloromethane. An undried polyetherimide having a moisture content of approximately 1% was used.

In Example 1, the reaction product of trimellitic anhydride acid chloride and polyphenylene ether was used as the functionalized polyphenylene ether. The reaction product had an intrinsic viscosity of 0.57 dl/g measured at 25° C. in chloroform and an OH terminal group concentration of approximately 100 ppm.

In Comparative Example A, common, i.e. non-functionalized, polyphenylene ether was used having an intrinsic viscosity of 0.46 dl/g measured in chloroform at 25° C. It has a terminal hydroxy group concentration of approximately 750 ppm.

The foregoing constituents were compounded in an extruder having an adjusted average temperature of 340° C. (speed: 300 rpm). Pellets were chopped from the resulting extrudate. Standardized plates for determining the properties were formed from the pellets by injection molding.

The compositions and the properties are recorded in Table 1:

TABLE 1

| | Example 1 | Example A |
|---|---|---|
| Composition (Parts by Weight) | | |
| polyphenylene ether | — | 50 |
| functionalized polyphenylene ether | 50 | — |
| polyetherimide | 50 | 50 |
| Properties | | |
| notch impact value according to IZOD (J/M) | 36 | 19 |
| tensile strength (MPa) | 81.2 | 74.2 |
| elongation at fracture (%) | 10 | 8 |

It may clearly be seen from the data in Table 1 that the polymer blend according to the invention (Example 1) has better properties than the known polymer blend (Comparative Example A).

EXAMPLES 2-21:

Copolymer Preparations

Example 2

PPE—MA was prepared by extruding a mixture of commercial PPE resin and maleic anhydride. The quantity of maleic anhydride ranged from 1.6 to 2.5% based on the weight of PPE. The extruded product was dissolved in chloroform, precipitated with methanol and dried to remove ungrafted anhydride before it was used. The PPE—TAAC was prepared by heating commercial PPE resin with trimellitic anhydride acid chloride and dimethylbutylamine in toluene at 100° C., then was precipitated with methanol and reprecipitated.

Alpha, omega-amine-terminated polyetherimide was prepared from bisphenol-A-diphthalic acid anhydride and m-phenylene diamine in dichlorobenzene with dimethyl-aminopyridine as a catalyst. The m-phenylene diamine was used in excess (3.3% and 10%).

Copolymer Preparation in a Helicone Reactor

A preheated Helicone reactor was charged with a dry-blended mixture of 30 g alpha, omega-amine-terminated polyetherimide ($P_n30$) and 30 g PPE—MA (prepared by reacting PPE with 1.62% maleic anhydride). Hot oil (300° C.) was circulated through the reactor to heat the contents. Within 7 minutes the reaction mixture reached 280° C. The reaction was continued for 3 minutes (temperature: 291° C.) and then the molten polymer was pulled out as an elastic, clear, light tan colored melt. When cool, strands of the product were tough and flexible and had become hazy. Solution cast films of the product were hazy.

Fractionation

A solution of 29.5 g of the reaction product described above in 350 ml chloroform was added to 1 liter of methanol in a blender. The precipitate was washed with methanol and dried. A portion of the precipitate (11 g) was dissolved in 200 ml hot methylene chloride, then stored at 0° C. for three days. A precipitate that had formed was filtered off, washed and dried, weight: 6.13 g. The filtrate was evaporated to dryness leaving 4.9 g residue. NMR analysis of the precipitate showed a composition of 75 weight percent PPE and 25 weight percent polyetherimide. Cast films (from chloroform) of the methylene chloride insoluble polymer were clear ($T_g$ 218° C.). Tg's for comparison: initial PPE, 219° C.; initial polyetherimide 208° C.; product before fractionation, 215° C.

Example 3:

Copolymer Preparation in a Small Scale Melt Reaction

A mixture of powdered PPE—MA (1.5 g, 2.5% MA) and 1.5 g alpha, omega-amine-terminated polyetherimide (nominally ($P_n$ 30) in a glass vessel was heated with a salt bath (300° C.) with stirring. After 6 minutes the melt temperature had reached 270° C. At this time, the product was cooled, dissolved in chlorobenzene and precipitated by adding to methanol in a mechanical blender. Product weight 2.81 g. Methylene chloride fractionation gave a precipitate (52%) with a composition of 83% PPE and 17% polyetherimide (w/w).

EXAMPLES 4-20:

Copolymer Preparation in Solution

Example 4

A solution of 3 g PPE—MA (prepared from 1.62 weight percent MA), 3 g alpha, omega-amine terminated polyetherimide and 0.03 g 2-hydroxypyridine in 25 ml chlorobenzene was refluxed under nitrogen for 24 hours with water removal via a Dean-Stark trap. The polymer was isolated by precipitation in methanol in a blender. The washed (methanol) and dried product weighed 5.2 g. Methylene chloride fractionation gave a precipitate (51% recovery) containing 86% PPE and 14% polyetherimide (w/w).

EXAMPLES 5-13

In Table 2 nine examples of copolymer preparation in o-dichlorobenzene are listed.

A pre-functionalized PPE was used in all examples in Table 2 except Example 10 in which PPE was reacted with TAAC immediately before the polyetherimide precursors were added. Small amounts of phthalic anhydride were added in the first five examples to chain stop some of the polyetherimide chains. None was added in later examples since it seemed to have little effect. A typical reaction is described below:

Example 11

A 250 ml flask was charged with 10.0 g PPE—TAAC and 100 ml o-dichlorobenzene and heated (oil bath at 160° C.) with stirring to dissolve the polymer. The flask was then charged with 1.925 g, (17.8 mmol) m-phenylene diamine (duPont), 8.744 g (16.8 mmol) bisphenol-A diphthalic acid anhydride (BPADA) and 37 mg sodium phenylphosphinate. The resultant solution was heated at reflux (180° C.), and a Dean-Stark trap was attached to the flask to remove water. Makeup o-dichlorobenzene was added periodically to replace material removed along with the water. As the reaction progressed, the mixture becomes somewhat turbid which was indicative of a small amount of phase separation. After 2.5 hours at reflux the reaction mixture was cooled to approximately 100° C. and added to vigorously stirred methanol (at 25° C.) in a mechanical blender. The solid polymer was collected on a filter, washed with methanol and dried at 80° C. (10 mm). Weight: 19 g.

When diazobicyclooctane (DABCO) was used as a catalyst the quantity was 20 mg. For examples 5–9, the quantities of m-phenylene diamine and BPADA were 17.07 and 16.26 mmol (phthalic anhydride: 0.81 mmol). For the melt reaction (Example 13) solvent was omitted, and the reaction was run at approximately 290° C. for 10 minutes, solidified on cooling, was dissolved in chloroform and was isolated as above.

In certain instances, gelation occurred when premade amine terminated polyetherimide (PEI) and PPE—TAAC were heated in refluxing o-dichlorobenzene in the presence of 2-hydroxypyridine and 4-dimethylaminopyridine catalysts.

TABLE 2

| Example # | Catalyst$^a$ | BPADA$^b$ | Functional PPE$^c$ | Variation$^d$ | IV$^e$ | IV$^f$ | IV$^g$ | Copolymer |
|---|---|---|---|---|---|---|---|---|
| 5 | DABCO | GE | Low IV | PPE-TAAC added late | — | | | 17% |
| 6 | DABCO | GE | Low IV | — | — | | | 16 |
| 7 | SPP | Baker | Low IV | PA added late | .69 | .78 | .52 | 24 |
| 8 | — | Baker | Com. | PA added late | .62 | .78 | .47 | 12 |
| 9 | SPP | Baker | Com. | PA added late | .62 | .80 | .51 | 15 |
| 10 | SPP | Baker | In situ | — | .89 | 1.20 | .50 | 22 |
| 11 | SPP | GE | Com. | — | .55 | .75 | .39 | 25 |
| 12 | SPP | GE | PPO-FA | — | .40 | .52 | .25 | 14 |
| 13 | SPP | GE | Com. | melt reaction | .70 | .65 | .40 | 11 |

$^a$DABCO - diazobicyclooctane, SPP - sodium phenylphosphinate.
$^b$Manufacturer of BPADA.
$^c$PPE-TAAC (IV 0.39 dl/g): made by solution process from low IV PPE, Com: commercial PPE-TAAC's made by the solution process; in situ: PPE-TAAC was generated by the solution process and used directly (without isolation from the reaction mixture) for the synthesis of the copolymer; PPE-FA:PPE-FA prepared by extrusion of PPE with fumaric acid (FA).
$^d$PPE-TAAC or PA (phthalic anhydride chain stopper) was added in several runs after the reaction of the other components was underway.
$^e$Intrinsic viscosity (dl/g) of the reaction product.
$^f$Intrinsic viscosity of the methylene chloride insoluble fraction (after fractionation).
$^g$Intrinsic viscosity of the methylene chloride soluble fraction (after fractionation).
$^h$Wt. % PEI in the methylene chloride insoluble fraction (after fractionation). A relative measure of copolymer formation.

Table 3 contains data for compositions prepared in a manner similar to example 11 above.

TABLE 3

Functionalized PEI was produced in situ. Monomer stoichiometry was calculated to give the targeted intrinsic viscosities listed below for the PEI portion of the mixture.

| Example # | PPE$^1$ | PEI Target IV | Catalyst$^2$ | Scale | IV$^3$ | IV$^4$ | IV$^5$ | Wt % PEI In MeCl$_2$ Complex |
|---|---|---|---|---|---|---|---|---|
| 14 | 1 | .2–.3 | 0.1% SPP$^6$ | 100 g | .615 | .278 | | 17 |
| 15 | 1 | .2–.3 | 0.001% SPP | 100 | .621 | .276 | | 17 |
| 16 | 1 | .1–.2 | 0.001% SPP | 100 | .626 | .234 | | 18 |
| 17 | 1 | .2–.3 | 0.001% SPP | 1000 | | | .514 | 14 |
| 18 | 1 | .1–.2 | 0.001% SPP | 1000 | | | .467 | 19 |
| 19 | 2 | .2–.3 | 0.001% SPP | 1000 | | | .343 | 7 |

TABLE 3-continued

Functionalized PEI was produced in situ. Monomer stoichiometry was calculated to give the targeted intrinsic viscosities listed below for the PEI portion of the mixture.

| Example # | PPE[1] | PEI Target IV | Catalyst[2] | Scale | IV[3] | IV[4] | IV[5] | Wt % PEI In MeCl$_2$ Complex |
|---|---|---|---|---|---|---|---|---|
| 20 | 2 | .1-.2 | 0.001% SPP | 1000 | | | .352 | 11 |

[1] 1 denotes commercial PPE-TAAC, 2 denotes PPE-fumaric acid
[2] Amount based on total weight of reactants
[3] IV (intrinsic viscosity) measured for the MeCl$_2$ complex
[4] IV measured for the MeCl$_2$ soluble portion of the complexation, essentially polyetherimide which has not reacted with PPE
[5] IV measured for the total product, prior to any complexation
[6] Sodium Phenyl Phosphinate

EXAMPLE 21:
Copolymer from PPE—TAAC

This experiment demonstrates that a copolymer can be formed using PPE—TAAC and a low molecular weight polyetherimide. A solution of 5 g PPE—TAAC, 2 g alpha, omega-amine-terminated polyetherimide ($P_n$ 10), and 1 g acetic acid in 40 ml toluene was heated at reflux under a nitrogen atmosphere to form a clear solution. Water was removed with a Dean-Stark trap. After 16 hours the solution was cooled and the polymer precipitated by adding the solution to methanol in a blender. The product was reprecipitated from benzene with water giving 6.6 g polymer. Methylene chloride fractionation gave a precipitate (72% recovery) containing 90% PPE and 10% polyetherimide (w/w).

Comparative Example B
Reaction of Commercial PPE with Diamine Polyetherimide (Control)

A small glass reactor was charged with 1.5 g commercial PPE ([n] 0.49 dl/g) and 1.3 g alpha, omega-amine-terminated polyetherimide ($P_n$=10) and flushed with nitrogen. The mixture was heated with stirring in a 295° C. salt bath for 5 minutes which gave the mixture a three minute exposure to 280°±10° C. As the sample cooled, chlorobenzene was added to dissolve the product. The polymer was precipitated from solution with methanol, washed and dried. Weight: 2.71 g. Methylene chloride fractionation gave a precipitate (54% recovery) containing 98% PPE and 2% polyetherimide.

The results of the experiments set forth in Examples 2-21 and Comparative Example B show that a polymer blend containing anhydride-functionalized polyphenylene oxide resulted in greater copolymer formation than a blend containing normal commercial polyphenylene oxide which resulted in very little copolymer formation.

Comparative Example C and Example 22
Comparison of Commercial PEI and Amine-Terminated PEI Equal weights of commercial PEI and functionalized PPE were co-precipitated from chloroform solution with methanol in an mechanical blender (to achieve intimate mixing), dried and then compression molded at 280° C. (30 sec. preheat without pressure and then 60 sec. at 5000 lb. pressure). Methylene chloride (MC) fractionations were performed to determine the presence of copolymer. The results are set forth in Table 4.

TABLE 4
Results of Examples with Commercial Polyetherimide

| Comparative Example # | Type of PPE | PEI in MC Ppt* |
|---|---|---|
| C-1 | PPE-MA (25% MA) | 3 wt % |
| C-2 | PPE (extruded with 3% citric acid) | 4 |
| C-3 | PPE-TAAC (commercial) | 3 |
| C-4 | PPE-FA (3% FA) | 2 |

*Polyetherimide in the PPE fraction, after precipitating twice.

The data of Table 4 show that only a small amount of copolymer is produced with commercial polyetherimide.

Example 22

Comparative Example C-3 above was repeated using amine-terminated PEI (IV 0.26 dl/g) instead of commercial PEI MC fractionation of the product: 25% polyetherimide in the MC ppt.

Thus, more copolymer is formed when more terminal amino groups are present in the polyetherimide.

Examples 23-28
PPE—TAAC and Amine-Terminated PEI at Various Molecular Weights Samples of PPE—TAAC and of amine-terminated PEI with different molecular weights were heated at 280° C. for 3 min. The polymers were present in equal weight ratios and also in equal molar ratios for these experiments. The results of MC fractionation of the products are shown in Table 5.

TABLE 5
Examples with Various Molecular Weights

| Example No. | MW of PPE(IV) | MW of Ultem (IV): | PEI (%) in the MC ppt (for equal weights of each polymer) | |
|---|---|---|---|---|
| | | | 3000 (0.13) | 18000 (0.40) |
| 23 | 3000(0.22 dl/g) | (approx.) | 14 | 26,35 |
| 24 | 5000(0.30) | | 25 | 21 |
| 25 | 8000(0.40) | | 22 | 21 (equimolar ratio) |
| 26 | 3000(0.22) | (approx.) | 14 | — |
| 27 | 5000(0.30) | | 26 | 35 |
| 28 | 8000(0.40) | (approx.) | 30 | 20 |

Examples 29 and 30

PPO/Polyetherimide Blends Containing PPE/Polyetherimide Copolymer

In Tables 6 and 7 below blend #1 is a control and was prepared from normal non-functional polymers. Blends #2-4 in Table 6 and 7 are a combination of non-functional polymers and copolymer samples. The copolymer samples were prepared from PPE—TAAC samples and amine-terminated PEI. The PPE—TAAC samples had been prepared in earlier extrusions from combinations of PPE and a trianhydride of trimellitic anhydride that was prepared by heating trimellitic anhydride with acetic anhydride and then removing the acetic acid that was produced. Blends #5-7 in Tables 6 and 7 were prepared by extruding mixtures of non-functional PPE and PEI in the presence of PPE—TAAC and amine-terminated PEI. In these cases copolymer was generated during this extrusion step, not earlier as for the other three examples. The PPE—TAAC had been prepared by extrusion of PPE with 10 wt. % trianhydride and then purified by dissolution in chloroform, precipitation with methanol and finally vacuum drying.

As the data in Table 7 below indicates, the main difference in the properties is a large increase in elongation for blends #2-6 vs the control and a small increase for #7. A substantially higher heat distortion temperature was found for blend #7. Furthermore, scanning electron micrographs of the control blend and a blend containing copolymer show much smaller diameter PPE domains in the PEI matrix when copolymer is present, indicating better dispersion of the PPE and polyetherimides phases.

TABLE 6

PPO/Polyetherimide Blends of Example 29

| Component | 1 | 2 | 3 | 4 | 5 | 6 | 7 |
|---|---|---|---|---|---|---|---|
| PPE[a] | 50 | 35 | 35 | 35 | 45 | 40 | 35 |
| PEI[b] | 59 | 35 | 35 | 35 | 45 | 40 | 35 |
| diamino-PEI[c] | | | | | 5 | 10 | 15 |
| PPE-TAAC[d] | | | | | | | |
| PPE-co-PEI[e] | | 30 | | | | | |
| PPE-co-PEI[f] | | | 30 | | | | |
| PPE-co-PEI[g] | | | | 30 | | | |

[a]Commercial PPE powder which had been extruded and vacuum vented
[b]Commercial PEI pellets
[c]IV 0.28
[d]made from extrusion with 10% by weight trianhydride
[e]made from co-extrusion of above diamino-PEI with PPE which has been extruded with 6% by weight trianhydride
[f]made from co-extrusion of above diamino-PEI with PPE which has been extruded with 9% by weight trianhydride
[g]made from co-extrusion of above diamino-PEI with commercial PPE-TAAC

TABLE 7

Properties of molded parts from above blends

| | Blend Number | | | | | | |
|---|---|---|---|---|---|---|---|
| | 1 | 2 | 3 | 4 | 5 | 6 | 7 |
| Yield Strength (psi) | 13700 | 13800 | 13900 | 13900 | 13400 | 13800 | 13900 |
| Yield Strain (in/in) | 0.136 | 0.167 | 0.169 | 0.163 | 0.152 | 0.153 | 0.151 |
| Break Strength (psi) | 11500 | 10400 | 10500 | 10700 | 8500 | 10300 | 12200 |
| Tensile Modulus (psi × $10^{-3}$) | 168 | 155 | 154 | 160 | 160 | 165 | 157 |
| Elongation (%) | 19 | 51 | 51 | 54 | 48 | 46 | 25 |
| HDT at 264 psi (C) | 178.8 | 176.5 | 175.5 | 177.5 | 176.5 | 179.2 | 184.0 |

EXAMPLE 30

All blends in this series were made on a 5 lb. scale. The components and concentrations of the blends are shown in Table 8. Quantities of each component are expressed in parts by weight. The blends were mixed in a Henschel mill and then extruded with a WP 28 mm extruder. The extruded strands were chopped into pellets and then injection molded into test specimens with an Engel-injection molding machine (nozzle temperature 550° F., zone 1 720° F., zone 2 700° F., zone 3 500° F., mold 220° F.; 600 psi injector pressure).

The copolymer, PPE-co-PEI was generated during the extrusion step from functionalized PPE and amine-terminated PEI. In most of the blends nonfunctional PPE and PEI with normal amine terminations which resulted in a final product (after extrusion) that was a mixture of PPE, PEI and PPE—PEI copolymer. All of the blends also contained impact modifiers (either Kraton ® 1651, available from Shell Chemical Company, or Siltem ®, available from General Electric Company).

The blends of Table 8 varied from each other in several ways:

(a) Blends 1 and 2 are control samples (no copolymer present).
(b) Blends 3, 4 and 5 differ in the amount of copolymer. The quantities of copolymer precursors were 30, 20 and 10 parts by weight, respectively. For blend 14 only copolymer precursors and impact modifier were used and the PPE had been previously reacted with 3% trianhydride instead of 7%.

(c) Blends 6 and 7 differed from the others by having overall PPE/PEI ratios of 25/75 and 75/25, respectively, instead of the usual 50/50.

(d) Blends 3, 8 and 9 represent blends with the same overall PPE/PEI ratio and the same copolymer level except that the molecular weight of the amino-PEI portion varies (intrinsic viscosities 0.11 to 0.34 dl/g). The ratio of amino PEI to PPE—TAAC had to be adjusted to maintain the correct stoichiometry for these two species.

(e) Blend 11 contains PPE—TAAC that was prepared with less trianhydride reagent present than for the PPE—TAAC used in earlier runs. This PPE—TAAC contains a lower concentration of anhydride groups on the PPE. Another blend (#10, not in the table) contained PPE—TAAC 3% but could not be successfully extruded.

(f) Blend 12 contained Siltem ® instead of Kraton ® 1651 as impact modifier. Siltem ® is a copolymer based on PEI blocks and silicone blocks.

(g) Blends 13, 100 and 101 contained commercially-available PPE—TAAC from varying sources instead of the material prepared from the extrusion of PPE with the trianhydride.

One of these PPE—TAAC's had been pre-extruded through a vacuum vented extruder to remove volatiles to determine if this would improve the final blend.

(h) Blend 102 contained PPE—FA as the functionalized PPE.

TABLE 9-continued

DATA FOR PPO/POLYETHERIMIDE BLENDS OF EXAMPLE 30

| Blend Number | Yield Strength (psi) | Yield Strain (in/in) | Break Strength (psi) | Tensile Modulus (psi × $10^{-3}$) | Elongation Break at (%) | HDT 264 psi (C) |
|---|---|---|---|---|---|---|
| 101 | 12000 | 0.178 | 5500 | 130 | 92 | 180.0 |
| 102 | 11400 | 0.182 | 4100 | 124 | 68 | 179.2 |

From the results set forth in Tables 8 and 9 above, several conclusions can be made.

PPE—TAAC prepared by an extrusion process can be used to prepare quality blends. Side products such as trimellitic acid (TMA) which is produced when PPE is extruded with the trianhydride do not interfere with good blend formation. Higher yield strengths were realized when the copolymer levels were high (compare blends 14, 3 and 2 and 1). Amino-PEI molecular weight makes little difference. The presence of Siltem ® impact modifier results in poor elongations. PPE—TAAC made commercially and made via the trianhydride are all effective copolymer precursors. One major difference that does not show up in the tensile testing data in the chart is that blends containing copolymer did not tend to delaminate during testing while the control samples did delaminate. Electron micrographs show much better dispersion of PPE-rich domains in the PEI-rich matrix when copolymer was present that when copolymer was absent. With 30% copolymer present, the domains were approximately twenty times smaller in diameter than for the control.

From the foregoing examples, it is clear that the polyphenylene ether-polyetherimide blends of the present invention have better mechanical properties and improved compatibility than the polyphenylene ether-polyetherimide blends of the prior art. The examples further show that the copolymers formed from these blends are effective compatibilizers for blends of polyphenylene oxide and polyetherimide.

While the present invention has been described with reference to particular embodiments thereof, it will be understood that numerous modifications may be made by those skilled in the art without actually departing from the spirit and scope of the invention as defined in the appended claims.

What is claimed is:

TABLE 8

PPE/Polyetherimide Blends of Example 30

| COMPONENT | Blend Number | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 11 | 12 | 13 | 14 | 100 | 101 | 102 |
| Commercial PPE | 50 | 50 | 35 | 40 | 45 | 10 | 60 | 30 | 32.5 | 35 | 35 | 35 | | 35 | 35 | 35 |
| Commercial PEI | 50 | 50 | 35 | 40 | 45 | 60 | 10 | 40 | 37.5 | 35 | 35 | 35 | | 35 | 35 | 35 |
| Commercial PPE-TAAC | | | | | | | | | | | | 15 | | | | |
| PPE-TAAC 3%[b] | | | | | | | | | | | | | 50 | | | |
| PPE-TAAC 5%[b] | | | | | | | | | 15 | | | | | | | |
| PPO-TAAC 7%[b] | | | 15 | 10 | 5 | 15 | 15 | 20 | 17.5 | | 15 | | | | | |
| AMINO-PEI IV 0.11[c] | | | | | | | | 10 | | | | | | | | |
| AMINO-PEI IV 0.31[c] | | | | | | | | | 12.5 | | | | 50 | | | |
| AMINO-PEI IV 0.34[c] | | | 15 | 10 | 5 | 15 | 15 | | | 15 | 15 | 15 | | 15 | 15 | 15 |
| KRATON ® 1651 | 10 | | 10 | 10 | 10 | 10 | 10 | 10 | 10 | 10 | | 10 | 10 | 10 | | |
| SILTEM ® | | 10 | | | | | | | | | 10 | | | | | |
| Commercial PPE-TAAC | | | | | | | | | | | | | | 15 | | |
| Commercial PPE-TAAC | | | | | | | | | | | | | | | 15 | |
| PPE-FA | | | | | | | | | | | | | | | | 15 |

[a]Vacuum-vented extruded prior to use
[b]Percentage indicates the amount of trianhydride used
[c]IV is intrinsic viscosity

TABLE 9

DATA FOR PPO/POLYETHERIMIDE BLENDS OF EXAMPLE 30

| Blend Number | Yield Strength (psi) | Yield Strain (in/in) | Break Strength (psi) | Tensile Modulus (psi × $10^{-3}$) | Elongation Break at (%) | HDT 264 psi (C) |
|---|---|---|---|---|---|---|
| 1 | 11900 | 0.161 | 4300 | 137 | 112 | 178.7 |
| 2 | 11500 | 0.146 | 11500 | 141 | 15 | 165.4 |
| 3 | 12000 | 0.156 | 8000 | 141 | 83 | 180.0 |
| 4 | 12000 | 0.158 | 7500 | 138 | 106 | 176.6 |
| 5 | 11900 | 0.163 | 5400 | 148 | 82 | 174.8 |
| 6 | 12500 | 0.198 | 8800 | 125 | 51 | 175.5 |
| 7 | 11000 | 0.160 | 6500 | 127 | 95 | 180.1 |
| 8 | 11800 | 0.175 | 7900 | 127 | 90 | 175.9 |
| 9 | 11800 | 0.191 | 7200 | 122 | 64 | 173.4 |
| 11 | 12000 | 0.199 | 4800 | 155 | 76 | 174.3 |
| 12 | 11100 | 0.150 | 11100 | 130 | 15 | 168.6 |
| 13 | 11700 | 0.185 | 5000 | 118 | 75 | 172.0 |
| 14 | 13600 | 0.198 | 8400 | 118 | 55 | 182.9 |
| 100 | 11800 | 0.191 | 4900 | 113 | 100 | 174.3 |

1. A polyphenylene oxide-polyetherimide copolymer comprising anhydride-functionalized polyphenylene oxide and amine-terminated polyetherimide.

2. A copolymer according to claim 1, wherein the copolymer comprises about 2 to 50% by weight of anhydride-functionalized polyphenylene oxide.

3. A copolymer according to claim 1, wherein the copolymer comprises about 2 to 50% by weight of amine-terminated polyetherimide.

4. A copolymer according to claim 1, wherein the anhydride-functionalized polyphenylene oxide is anhydride-functionalized poly(2,6-dimethyl-1,4-phenylene oxide).

5. A copolymer according to claim 1, wherein the anhydride-functionalized polyphenylene oxide comprises the reaction product of poly(2,6-dimethyl-4-phenylene-oxide) and trimellitic anhydride acid chloride.

6. A copolymer according to claim 1, wherein the anhydride-functionalized polyphenylene oxide comprises the reaction product of poly(2,6-dimethyl-1,4-phenylene oxide) and maleic acid anhydride.

* * * * *